United States Patent [19]

Bowen

[11] 4,009,239

[45] Feb. 22, 1977

[54] METHOD OF FORMING TABLETS WITH SEPARATORS OF SHEET MATERIAL

[76] Inventor: Max E. Bowen, 30885 W. Six Mile Road, Livonia, Mich. 48152

[22] Filed: July 11, 1975

[21] Appl. No.: 596,036

Related U.S. Application Data

[63] Continuation of Ser. No. 378,734, July 12, 1973, abandoned.

[52] U.S. Cl. .............................. 264/112; 264/125; 264/153; 264/155; 264/163; 264/250; 264/259; 264/265

[51] Int. Cl.[2] ...................... A61J 3/10; B29B 1/32; B29C 11/00; B29F 5/00

[58] Field of Search .......... 264/112, 135, 259, 163, 264/297, 153, 160, 257, 109, 123–126; 426/105, 125; 425/110, 117, 122, 406, 407

[56] References Cited

UNITED STATES PATENTS

| | | | |
|---|---|---|---|
| 697,498 | 4/1902 | Kraus | 425/122 |
| 1,505,827 | 8/1924 | Villasenor et al. | 425/292 |
| 1,657,566 | 1/1928 | Crozier | 264/30 |
| 2,210,196 | 8/1940 | Baldwin | 206/800 |
| 2,314,838 | 3/1943 | Kingston | 425/407 |
| 2,451,318 | 10/1948 | Burstiner | 426/108 |
| 2,587,928 | 3/1952 | Tuck et al. | 206/446 |
| 2,836,291 | 5/1958 | Stroop | 426/125 |
| 2,921,672 | 1/1960 | Ivy et al. | 206/535 |
| 2,973,555 | 3/1961 | Schwepke | 425/801 |
| 3,030,666 | 4/1962 | Adams | 264/153 |
| 3,057,018 | 10/1962 | Lawrence et al. | 264/257 |
| 3,427,688 | 2/1969 | Wilson | 264/153 |
| 3,761,220 | 9/1973 | Dirne | 425/407 |

FOREIGN PATENTS OR APPLICATIONS

| | | | |
|---|---|---|---|
| 692,926 | 11/1930 | France | 264/107 |

*Primary Examiner*—Willard E. Hoag
*Attorney, Agent, or Firm*—Krass and Young

[57] ABSTRACT

Chemical tablets for insertion into settling tanks and the like to dissolve solid waste material are formed in a tablet making press having a female die section which is charged with chemical in powder form. One end of an elongated strip of water soluble paper, having a heat and pressure activated adhesive coating on one surface extends between the female die and the male die carried by the press ram and is advanced in timed relation to the motion of the press. The male die section has a sharpened edge and is heated. As it moves into contact with the female die section it cuts out a separator from the sheet strip and adheres it to the tablet as it is formed. A plurality of such tablets are stacked in a cylindrical container with the separators disposed between adjacent tablets to prevent the tablets from sticking together. In use, the tablet with the separator is thrown into the settling tank and the paper separator is dissolved along with the other solid waste material.

7 Claims, 9 Drawing Figures

METHOD OF FORMING TABLETS WITH SEPARATORS OF SHEET MATERIAL

This is a continuation, of application Ser. No. 378,734 filed July 12, 1973 and now abandoned.

BACKGROUND OF THE INVENTION

1. Field of the Invention

This invention relates to a method of forming solid tablets from powdered chemical material with separator sheets adhered to the tablets and more particularly to such a method as used to form tablets of waste reactive material employed to dissolve solid waste material.

2. Prior Art

In order to promote the dissolution of solid waste material in settling tanks forming portions of human waste disposal systems, as in boats, recreational vehicles or the like, or septic tank systems, chemical compositions have been developed which will react with various solid materials, including proteins and celluloses, to covert them to soluble form. The liquified waste liquor may then be drained from the settling tank leaving little or no solid residue. The chemical charges are commercially available in tablet form and typically packaged in cylindrical containers having a number of tablets stacked one above the other. These tablets are formed by pressing powdered chemicals and they tend to become stuck together in their containers so that it is difficult to separate a single tablet for use.

One method of preventing the tablets from adhering to one another would be to insert separators of non-reactive sheet material between each pair of tablets within a container. The present invention is an extremely simple and low cost method of forming such separators and disposing them relative to the tablets in their container, which depends for its utility on the fact that the tablets are ultimately used in a process where solids are dissolved and disposed of, so that the tablets may be used without the necessity of removing the separators.

SUMMARY OF THE INVENTION

Broadly, the present invention contemplates forming separator sections of sheet material from strip stock in the same pressing operation that is used to form the tablets out of powdered chemical and adhering a separator to one surface of each tablet in this operation. The tablets may then be stacked in their containers with the integral separators disposed so as to separate adjacent tablets. No additional processing or handling of the separators is required. When the tablets are to be placed in a settling tank or the like there is no need to remove the integrally formed separator. The tablet and separator are placed in the liquid of the tank and the liquid dissolves the separator.

The process of forming the tablet with integral separators in a single operation utilizes a normal tablet forming press having a female die section which is charged with powdered chemical material and a male die section carried by the press ram. The male section is heated to enhance the adhesion of the separator to the tablet. To form the separators integrally with the capsules a tape of liquid soluble sheet material having adhesive coating on one side, from which the separators strips are to be formed, is supported so that one end of it extends between the male and female die sections. The male die section has a sharpened edge which coacts with female die section to cut out a separator from the strip, leaving the strip integral, but with a hole formed therein. This separator is pressed against the chemical charge in the female die section by the male die section so that the pressure and heat cause it to adhere to the tablet thus formed. The tablets are thereafter handled and packaged in the normal manner with care being taken to insure that the side of the tablets with the integral separators are all facing in the same direction.

In more detailed form the preferred embodiment of the method of the present invention involves the use of a thin flat stripper plate having a hole large enough to accommodated the male die halve spaced closely above the upper surface of the female die halve. The strip of paper from which the separators are to be formed passes between the stripper plate and the female die. After a tablet is formed and removed from the female die by a knock-out, the section of the strip having a hole in it maintained over the die cavity while a filler nozzle attached to a chemical hopper sweeps over the top of the stripper plate and fills the female die cavity with powder. Then the paper strip is advanced to bring a new section over the die cavity. A vacuum nozzle, carried by the filler nozzle, then sweeps over the hole in the stripper plate so as to remove the material lying above the paper strip. An air blast directed at the stripper plate hole also aids in removing any powder from the stripper plate hole. The heated die next descends cutting out a separator by coaction of its edge wth the sides of the female die cavity and heating and pressing the separator section against the chemical in the die cavity to form a tablet with the separator adhered to the tablet. As the press ram begins to rise, a pneumatic knock-out rod positioned below the female die cavity raises to maintain the separator section in contact with the ram so as to prolong the heating action and the adhesion of the separator to the tablet. The knock-out raises the tablet with its integral separator until the lower edge of the tablet is flush with the upper surface of the stripper plate. The filler nozzle moves in to refill the female die cavity and knocks the completed tablet into a delivery chute.

The separator not only acts to prevent the packaged tablets from adhering from one another but separates the chemical from the heated press ram so as to prevent the chemical from adhering to the press ram.

The present invention thus provides a simple, low cost method of preventing settling tank tablets from adhering to one another in their package.

Other objectives, advantages and applications of the present invention will be made clear by the following detailed description of a preferred embodiment of the invention. The description makes reference to the accompanying drawings in which.

Figure 1:
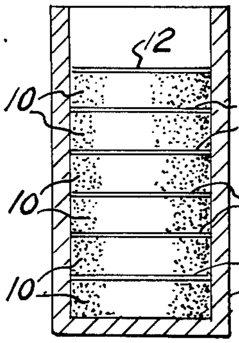
FIG. 1 is a sectional view through a cylindrical container for tablets having integral separators formed in accordance with the present invention.

The preferred embodiment of the method of the present invention produces cylindrical tablets 10 having circular paper separators 12 adhered to and completely covering one surface of the tablet. The tablets are adatped to be stacked in a cylindrical container 14 with their separators all on a common side, so that one separator is disposed between each abutting pair of tablets and acts to prevent them from adhering from one another.

While the preferred embodiment of the present invention produces tablets 10 which are intended to be placed in settling tanks to aid in dissolution of solid waste matter introduced into the tanks, which allows the tablets 10 with their integral separators 12 to be placed in the tank without removing the separators, other embodiments of the invention could be used to form different types of tablets having integral separators to prevent their adhering to one another in their shipping containers.

The tablets and separators are formed in a conventional tablet making press, generally indicated at 16, specially modified to form the separators with the tablets. The press includes a bed 18 having a die with a female cavity 20 supported on its upper side. A ram 22 carries a cylindrical male die member 24 having a sharpened cutting edge toward and away from bed 18.

A flat stripper plate 26 is supported above the top surface of the press bed 18 in close spaced relationship so that a thin strip of paper 28 may pass between the two. The paper is preferably of a liquid soluble type and its underside is coated with a heat activated adhesive. The paper strip 28 is provided from a supply roll 30 and the used material is drawn onto a take-up roll 32. Conventional means (not shown) are provided for rotating the take-up roll 32 in timed relation to the operation of the press in order to advance the paper strip.

Figure 2:
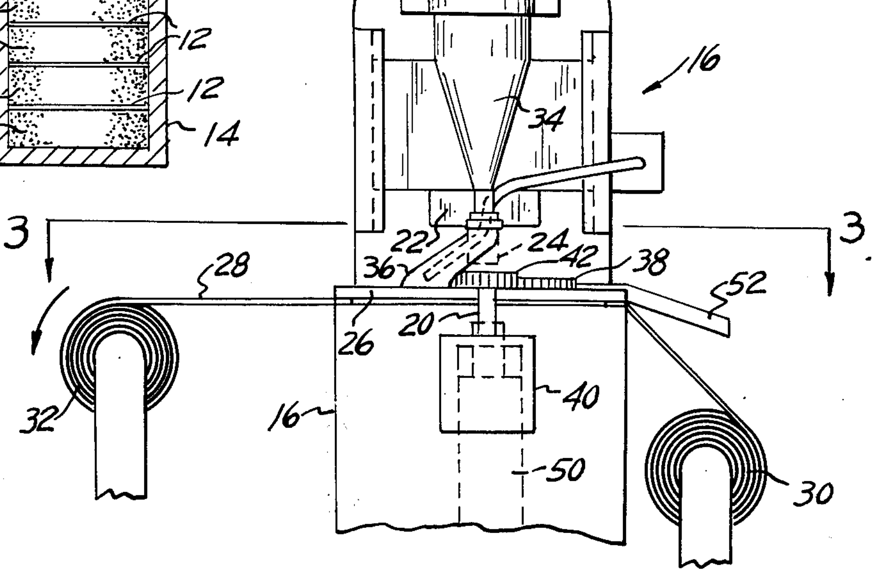
FIG. 2 is a front view of a tablet press equipped with attachments for practicing the present invention.

The press 16 supports a hopper 34 filled with the powdered chemical material used to form the tablets. The lower end of the hopper 34 connects to a nozzle 36 pivotably supported relative to the bottom of the hopper and adapted to sweep across the upper surface of the stripper plate 26 in an arcuate path when properly actuated. In FIG. 2 the nozzle 36 is illustrated as being connected to a sector gear 38 driven by a hydraulic motor 40 acting through a pinion gear 42. Other appropriate means may be used for moving the nozzle 36 in timed relation to the operation of the press,.

The lower end of the nozzle 36 is open but normally blocked by contact with the upper surface of the stripper plate 10. However, the path of the nozzle intersects a hole 44 formed in the stripper plate directly above the female die cavity 20. The hole 44 is just slightly larger in diameter than the die cavity 20. As the nozzle 36 passes over the hole 44, the powder contained in the hopper 34 is allowed to fall into the hole 44. A vacuum nozzle 46 is supported on the sector gear 38 so as to follow the nozzle 36 as it moves across the stripper plate 26.

The press is also equipped with a knock-out 48 powered by a pneumatic cylinder 50 in timed relationship to the operation of the press so as to remove a completed tablet from the press and pass it onto an output chute 52.

Figure 4:
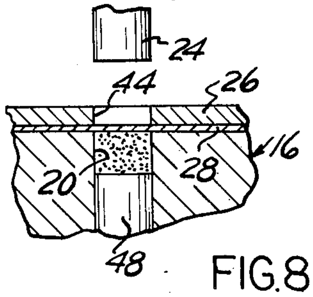
FIGS. 4, 5, 6, 7, 8 and 9 are schematic views of the pressing station of the apparatus of FIGS. 2 and 3 illustrating the successive steps in the practice of the method of the present invention.
Figure 5:
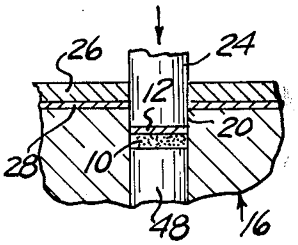

Referring now to the operational sequence illustrated by FIGS. 4 through 9, assume the cycle to begin, as illustrated in FIG. 4, when the female die cavity 20 is filled with a charge of chemical powder which is supported on top of the knock-out 48, the strip of paper 28 covers this charge and the female die cavity and the press ram 22 is descending. The press die 24 has a sharpened bottom edge which coacts with the sides of the female die cavity 20 to cut a circular segment 12 from the paper strip 28. The die 24 is suitably heated which tends to activate the adhesive coated on the bottom side of the separator 12. The ram continues to descend as illustrated in FIG. 5 and presses the charge contained in the female die cavity 20 into a tablet 10 against the upper surface of the knock-out 48.

Figure 6:
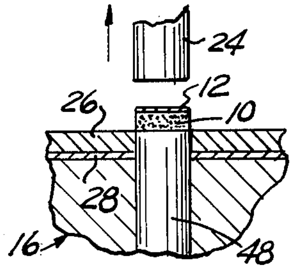

As the press ram 22 begins to rise, the knock-out 48 follows it, maintaining the pressured contact on the newly formed tablet 10 and maintaining the heat on the adhesive coating of the separator 12. The knock-out follows until the newly formed tablet 10, with a separator 12 adhered to it, is disposed with its bottom parallel to the upper surface of the stripper plate 26, as shown in FIG. 6.

Figure 7:
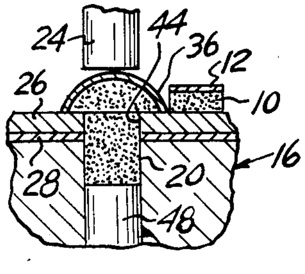

The nozzle 36 rotated by the motor 40 through the gears 38 and 42 now sweeps across the surface of the stripper plate pushing the newly completed tablet 10 in the direction of the output chute 52, where it may be carried by gravity into a suitable container. As illustrated in FIG. 7, the nozzle deposits a new charge of chemical in the female die cavity 20 and in the hole 44 of the stripper plate as it moves across that hole. The discharge may be power or gravity fed.

Figure 8:
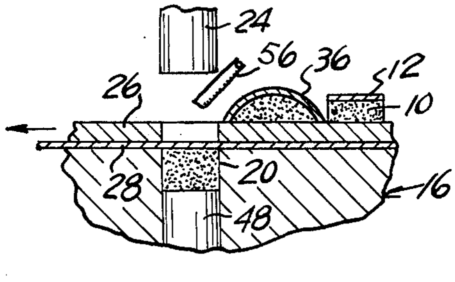
Figure 9:
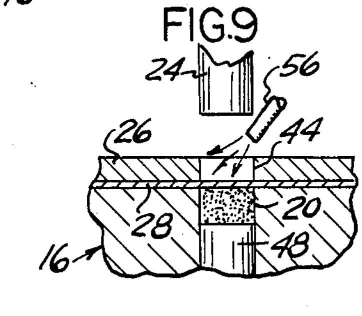

Next in the sequence, as shown in FIG. 8, the takeup reel 32 indexes the paper strip 28 so that the new section moves to cover the charge in the female die cavity 20 and separates it from that relatively small amount of powder which is contained in the hole 44 of the stripper plate. The section of the paper strip 28 with holes 54 formed therein where separator segments 12 have been removed is taken up on the reel 32.

Figure 3:
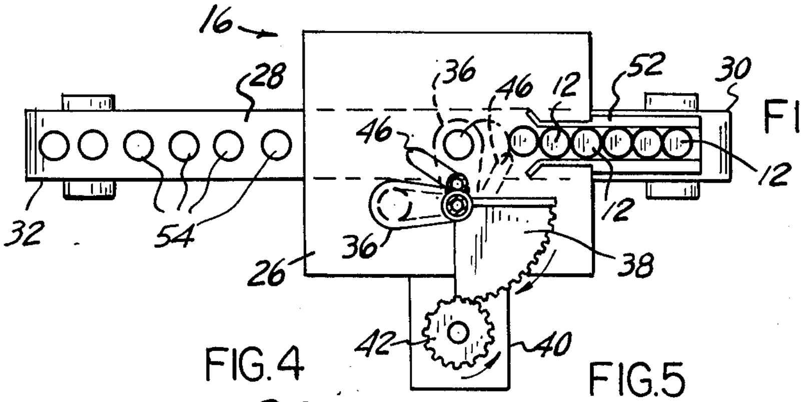
FIG. 3 is a top plan sectional view of the press of FIG. 2 taken along line 3—3 of FIG. 2.

The nozzle 36 then sweeps back over the stripper plate 26 and the suction nozzle 46 moves over the hole 44 in the stripper plate 26 (FIG. 3) and tends to remove the chemical powder contained therein and supported above the paper strip 28. As shown in FIG. 5 a blast of air from a nozzle 56, suitably supported on the press, also aids in cleaning the cavity 44 of powder so that the powder will not stick to the heated surface of the male die 24.

The cycle is then completed and the ram 22 descends carrying the male die against the paper strip 26 and the chemical charge in the female die cavity 20, forming the next tablet.

It would be understood that the invention is not limited by the specific form of apparatus illustrated and other conventional tablet forming arrangements may be employed.

Having thus described my invention, I claim:

1. A method of forming a tablet having a separator of sheet material, using a press having a ram, comprising: filling a female die cavity shaped complementary to the ram with a charge of powdered material suitable for tabletting by heat and pressure, covering the charge with a sheet material having a heat sensitive adhesive coating formed on a side adjacent said powdered material so the sheet material is disposed between the female die cavity and the press ram, heating the press ram, moving the ram in the direction of the die cavity so as to contact an uncoated side of the sheet material to first separate a section of said sheet material from a remainder thereof and then moving said ram into the die cavity to press said section under the force of the ram into contact with the powdered material so as to form a tablet conforming to the shape of the female die cavity, and having the section of sheet material covering one side thereof and adhered thereto be said adhesive to act as a separator.

2. The method of claim 1 comprising the further step of stacking a plurality of formed tablets with adhered separators so that the separators prevent the tablets from contacting one another.

3. The method of claim 1 wherein the sheet material takes the form of an elongated strip which is advanced relative to the ram between strokes of the ram.

4. The method of forming tablets of chemical material: filling a female die cavity and an aperture in a stripper plate, supported directly above the die cavity, with a charge of said chemical material in an unformed state said chemical material being suitable for tabletting by heat and pressure; advancing a strip of sheet material between the die cavity and the stripper plate; removing said chemical material from the aperture in the stripper plate above the sheet material; then moving a press ram, having a male die section complementary with said female die cavity and having a sharpened edge, through said aperture, against said strip and coacting with the female die so as to substantially simultaneously cut off a portion of said strip, form the charge into a tablet and adhere the cut strip portion to the tablet.

5. The method of claim 4 wherein the bottom of the female die section is closed by a movable knock-out and the knock-out raises as the male die is removed from said female die section, so as to maintain the completed tablet with its attached cut-out strip section against the male die.

6. The method of claim 5 wherein the female die section is filled by a nozzle which knocks the completed tablet with its attached strip section onto an output chute.

7. The method of claim 4 wherein the tablets are liquid soluble and the sheet material is liquid soluble.

* * * * *